United States Patent [19]

Plevak et al.

[11] 4,004,771
[45] Jan. 25, 1977

[54] BALL-AND-SOCKET TYPE CONNECTIONS FOR USE WITH MINING APPARATUS

[75] Inventors: Lubomir Plevak, Lunen, Horstmar; Norbert Hölken, Altlunen, both of Germany

[73] Assignee: Gewerkschaft Eisenhutte Westfalia, Lunen, Germany

[22] Filed: Mar. 5, 1975

[21] Appl. No.: 555,747

Related U.S. Application Data

[63] Continuation-in-part of Ser. No. 391,366, Aug. 24, 1973, abandoned.

[30] Foreign Application Priority Data

Sept. 9, 1972 Germany .................. 2244312

[52] U.S. Cl. .................. 248/357; 403/123
[51] Int. Cl.² .................. E21D 15/55
[58] Field of Search .......... 248/484, 481, 357, 288; 403/123, 122, 90, 56; 61/45 D, 45 C

[56] References Cited

UNITED STATES PATENTS

| | | | |
|---|---|---|---|
| 3,425,656 | 2/1969 | Bore | 248/357 |
| 3,722,846 | 3/1973 | Albrecht | 248/357 |
| 3,782,673 | 1/1974 | Wehrens | 248/357 |

FOREIGN PATENTS OR APPLICATIONS

| | | | |
|---|---|---|---|
| 1,937,318 | 2/1971 | Germany | 248/357 |
| 1,216,224 | 5/1966 | Germany | 248/357 |
| 1,082,740 | 9/1967 | United Kingdom | 248/357 |
| 1,262,991 | 2/1972 | United Kingdom | 61/45 D |

Primary Examiner—Roy D. Frazier
Assistant Examiner—Robert W. Gibson, Jr.
Attorney, Agent, or Firm—Sughrue, Rothwell, Mion, Zinn & Macpeak

[57] ABSTRACT

A ball-and-socket type connection particularly intended for interconnecting a prop and a roof bar or floor rail of a mine roof support assembly. The connection has a socket formed on the bar or rail and a ball part formed on the prop. The socket part has a curvilinear inner wall portion which receives the ball part and a rectilinear frusto-conical outer wall portion which widens outwardly of the socket part to form a mouth. The ball part has a bore or recesses which receives a securing means which may be a onepiece or multi-part elongate structure. The securing means extends into the socket part to engage with the bore or recesses in the socket part and lies alongside the outer wall portion of the socket part. The securing means is detachably connected to the bar or rail in a position readily accessible from the side adjoining the mouth of the socket part when the connection is in use.

24 Claims, 8 Drawing Figures

BALL-AND-SOCKET TYPE CONNECTIONS FOR USE WITH MINING APPARATUS

CROSS REFERENCE TO RELATED APPLICATIONS

This application is a continuation in part application of U.S. patent application No. 391,366 filed Aug. 24, 1973 and now abandoned.

BACKGROUND TO THE INVENTION

The present invention relates generally to a connection particularly, but not solely, intended for connecting components such as roof bars or floor rails to support props in mine roof support assemblies.

It is known to connect props and roof bars of mine roof support assemblies with ball-and-socket type connections or joints with the socket part of the connection being provided on the roof bar and the ball part of the connection being provided on the head of the prop. It is also known to flexibly attach the ball part of the connection to the roof bar with a bolt or cable which passes through the ball part and across the socket part and is affixed to the roof bar at the sides thereof generally remote from the socket part of the connection. A problem with this form of construction is that is is difficult to assemble and dis-assemble since the bolt or cable is not readily accessible. Other constructions are also known but these generally occupy considerable space and are somewhat expensive and/or are difficult to assemble and dis-assemble in the cramped condition usually encountered in a mine working.

A general object of the present invention is to provide an improved connection which is simple to construct, reliable in operation and which is above all easy to assemble and dis-assemble in situ.

In its broadest aspect the invention provides a ball-and-socket type connection for connecting a first member perpendicularly to a second member. The connection comprises a socket part located on the first member and having a mouth, a ball part receivable within the socket part after introduction through the mouth and provided on the second member and securing means attachable to the first member at a position or positions offset from the centre of the ball part, when received by the socket part in the direction of the mouth of the socket part and readily accessible from the side thereof nearest the socket part without removal of the ball part. The securing means is adapted to extend into the socket part to engage within a reception bore or recess in the ball part to maintain the latter in the socket part.

The connection is particularly useful for connecting a support prop to an elongate component such as a roof bar or floor rail where the ball part would be provided on the prop and the socket part would be provided on the bar or rail.

The invention also provides the combination of a bar or rail having a socket part provided with a curvilinear inner wall portion adjoining an outer frusto-conical rectilinear wall portion which widens outwardly away from the inner wall portion to form a mouth and a ball part received within the socket part. The ball part is shaped for introduction through the mouth of socket part and for mating with the curvilinear wall portion of the socket part and is carried by the head or foot of a support prop. Separate detachable securing means is provided for maintaining the ball part within the socket part. This securing means is detachably connected to the bar or rail by fixing means at one or more positions accessible from the side of the bar or rail nearest to or adjoining the mouth of the socket part and extends within the socket part to engage within a bore or recess in the ball part.

The securing means can take a variety of forms. In one construction the securing means is a shaped unitary member which extends through a bore in the ball part. Alternatively, the securing means may be a bendable unitary member which is locatable within a bore in the ball part. This member, which may be resilient, may have, at least when installed, a generally U-shaped profile with divergent arms projecting outwardly of the socket part. These divergent arms may lie in contact with and alongside the aforesaid rectilinear wall portion of the socket part. These arms may also have end portions which engage on the side of the bar or rail adjacent the mouth of the socket part or in a pocket thereat.

To aid in location of the member it is preferable for the bore to have outwardly flared openings at the periphery of the ball part.

In another construction the securing means is composed of at least two rod-like members each having one end portion engageable in a recess in the ball part and another end portion detachably securable to said bar or rail. Each of these members may again contact and lie alongside the rectilinear wall portion of the socket part. These members may be rectilinear with their end portions terminating in the region of the mouth or angular structures with one limb projecting into the socket part to engage in the ball part and another limb engaging or lying alongside the side of the bar or rail adjoining the mouth and detachably secured thereto or engaging in a pocket at the side of the bar or rail adjoining the mouth.

In operation, the aforesaid securing means of whatever type would normally only be subjected to tensile or compressive force and only slight deformation of the securing means would be experienced.

The invention may be understood more readily, and various other features of the invention may become more apparent from consideration of the following description.

BRIEF DESCRIPTION OF DRAWING

Embodiments of the invention will now be described, by way of examples only, with reference to the accompanying drawings, wherein.

DESCRIPTION OF PREFERRED EMBODIMENTS

Figure 1:
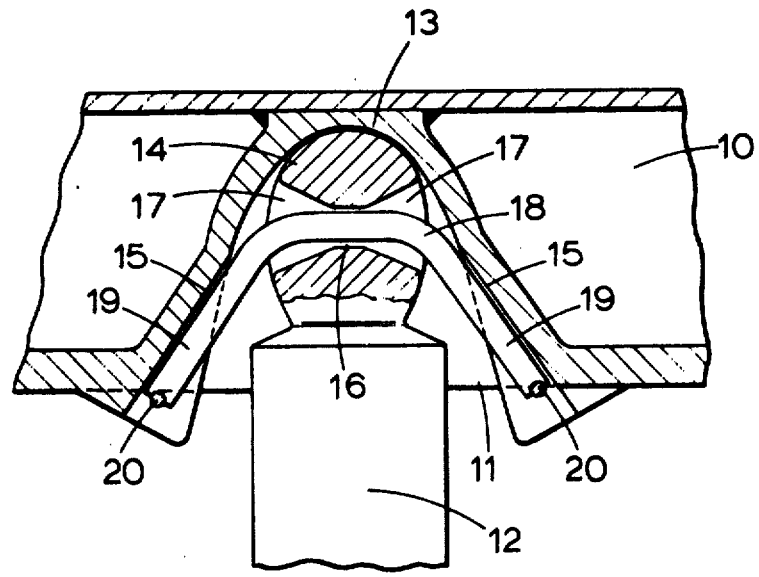
FIG. 1 is a sectional side view of a roof support bar and prop provided with a connection made in accordance with the invention.

Referring initially to FIG. 1 there is shown part of a mine roof support bar 10 provided with an aperture 11 on its underside. This aperture 11 accommodates a connection for connecting the bar 10 to the head of hydraulically-operated telescopic prop 12 which serves to carry the bar 10. The structure may form part of a mine roof support assembly of generally known type. The connection is a ball-and-socket type connection constituted by a socket part 13 provided within the aperture 11 of the bar 10 and a ball part 14 provided on the head of the prop 12. The socket part 13 is formed by shaping a lower wall of the bar 10 and the wall defining the socket part 13 can be welded at its upper end to the inner face of an upper wall of the bar 10 as shown. The wall defining the socket part 13 has a curvilinear upper portion shaped to receive the ball part 14 to enable the latter to move, within limits, in any direction in known manner. This curvilinear upper portion of the defining wall merges with a rectilinear lower portion 15 which is frustoconical and widens out towards the prop 12 to form, at the lower end of the socket part 13, a mouth through which the ball part can be introduced into the socket part 13. The ball part 14 of the prop 12 is formed integrally with the head of the prop 12 and has a diametric passage or bore 16 extending generally parallel to the longitudinal axis of the bar 10. This bore 16 is flared outwardly at the opposite surfaces of the ball part 14 to form trumpet-shaped openings thereat. A securing means is provided for securing the ball part 14 of the connection to the socket part 13. In this construction the securing means is a one-piece member 18 of generally inverted U-shape with divergent downwardly-extending arms 19. The member 18 has a portion between the arms 19 which lies within the bore 16 when assembled. The arms 19 lie closely adjacent, or in engagement with, surfaces of the wall of the lower portion 15 of the socket part 13 in the region of the mouth. The bar 10 is provided with lugs or flanges which receive fixing means in the form of detachable pins 20 serving to connect the arms 19 of the member 18 to the bar 10 in positions readily accessible from the underside of the bar in the vicinity of the mouth. The pins 20 may be tapered to form a force-fit with aligned holes in the arms 19 and the flanges although other forms of fixing means, such as sleeves, bolts or screws, or wedges can also be employed.

To assemble the connection, the member 18 can be initially positioned in the bore 16 and the socket part 13 and the ball part 14 can then be brought together. The pins 20 or other fixing means would then be use to secure the member 18 to the bar 10. To dis-assemble the connection the reverse procedure is carried out, i.e., the pins 20 or other fixing means are removed and the socket part 13 and ball part 14 are drawn apart. The operation of bringing the ball part 14 and the socket part 13 together or apart is best effected by raising or lowering the prop 12. The member 18 may be replaced from time to time by disassembly of the connection as described and by utilizing a replacement member 18. It is also feasible for the insertion and removal of the member 18 to be effected without necessitating the removal of the ball part 14 from the socket part 13. In an alternative form the member 18 is not preformed but instead is made from a flexible or bendable material which is possibly resilient and which can be made to assume the shape depicted in FIG. 1. The member 18 would normally be straight and would be inserted from below into the bore 16. The widened opening 17 of the bore 16 and the divergent portion 15 of the socket part 13 serve to aid the insertion of the member 18. When the leading end of the member 18 emerges from the other opening 17 it will be guided downwardly by the appropriate surface of the wall of the portion 15. Thereafter the ends of the bent member 18 would be secured by the pins 20, or other fixing means.

Figure 2:
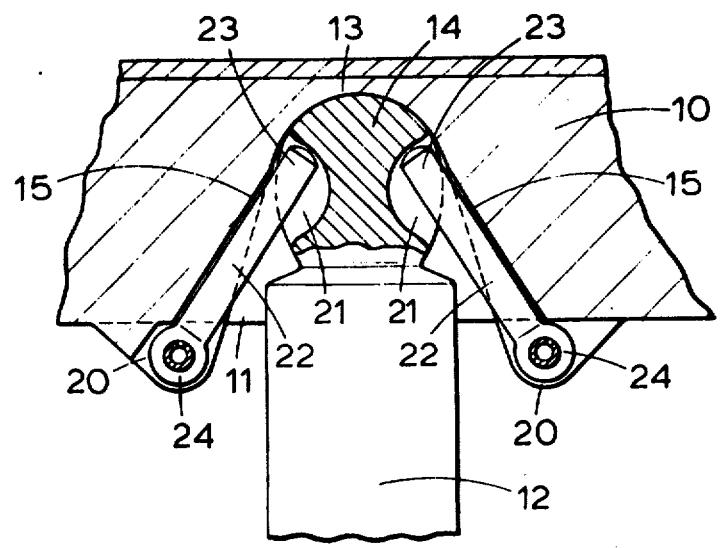
FIG. 2 is a sectional side view of a roof support bar and prop provided with another connection made in accordance with the invention.

FIG. 2 depicts a further different embodiment of a connection made in accordance with the invention and for convenience like reference numerals are used to designate the same parts or features. In the construction shown in FIG. 2, the socket part 13 is formed integrally with the roof bar 10. The ball part 14 of the connection is not provided with a through bore, as in the construction of FIG. 1, but instead has two diametrically-opposed recesses 21. The securing means here take the form of two separate rod-like members 22 each of which has an end portion 23 received within one of the recesses 21. The other, i.e. lower end portion 24, of each member 22 is detachably secured to the bar 10 in the region of the mouth with fixing means generally designated 20. The fixing means 20 is again readily accessible from the underside of the bar 10.

In the illustrated construction the end portion 24 of each member 22 has an integral ring 24 which receives a clamping sleeve located in a flange on the underside of the bar 10. The members 22 engage on surfaces of the wall of the divergent portion 15 of the socket part 13.

The members 22 can be installed and removed without the necessity to remove the ball part 14 from the socket part 13.

Figure 3:
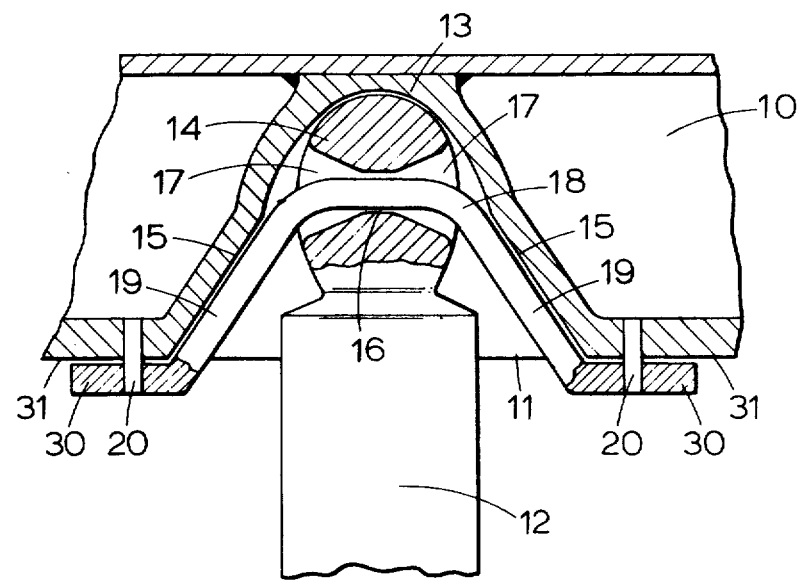
FIG. 3 is a sectional side view of a modified form of the connection shown in FIG. 1.

FIG. 3 depicts a modification to the connection shown in FIG. 1 and like reference numerals are used to denote like parts. In this modified connection the arms 19 of the member 18 do not terminate at the mouth of the socket part 13 but adjoin end portions 30 which extend from the mouth parallel to and preferably in contact with the underside 31 of the bar 10. The fixing means 20 much as pins, sleeves, bolts or screws as mentioned previously may, in this modified connection, secure the portions 30 directly to the underside 31 of the bar as shown. The lugs or flanges used to receive the fixing means 20 in the FIG. 1 type connection may thus be dispensed with. The member 18 may again be a pre-formed component or a bendable component shaped when assembled permitting the member 18 to be installed and removed without removal of the ball part 14 from the socket part 13.

Figure 4:
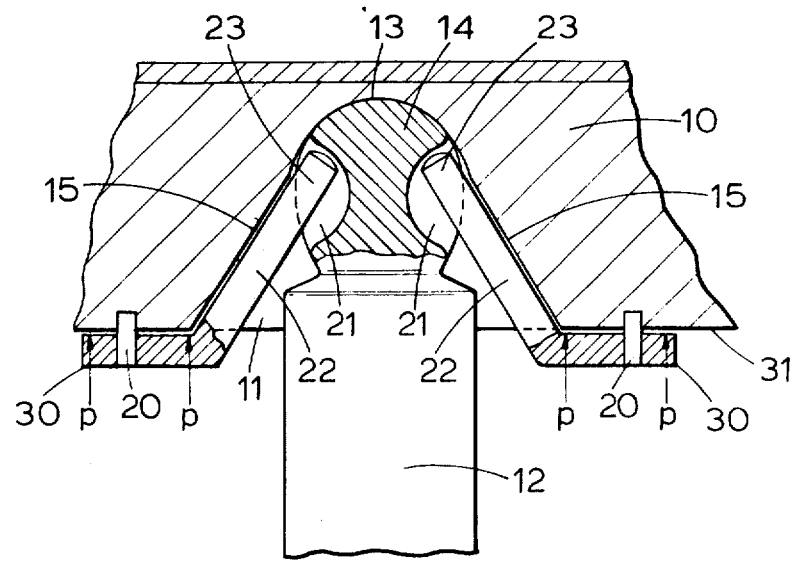
FIG. 4 is a sectional side view of a modified form of the connection shown in FIG. 2.

FIG. 4 depicts a modification to the connection shown in FIG. 2 and again like reference numerals are used to denote like parts.

In this modified connection each member 22 is of angular configuration rather than rectilinear. Thus each member 22 has an outer portion 30 which extends from the region of the mouth of the socket part parallel to and preferably in contact with the underside 31 of the bar 10. The fixing means 20 such as pins, sleeves, bolts or screws as mentioned previously may, in this modified connection, secure the portions 30 of the members 22 directly to the underside 31 of the bar 10 at one position as shown or at several positions as represented by the arrows P. The lugs or flanges used to receive the fixing means 20 in the FIG. 2 type connection can be dispensed with as shown. As with the rectilinear member 22 of FIG. 2 the angular members 22 of FIG. 4 can be installed or removed without the necessity to remove the ball part 14 from the socket part 13 and the fixing means 20 is readily accessible from the underside 31 of the bar 10.

Figure 5:
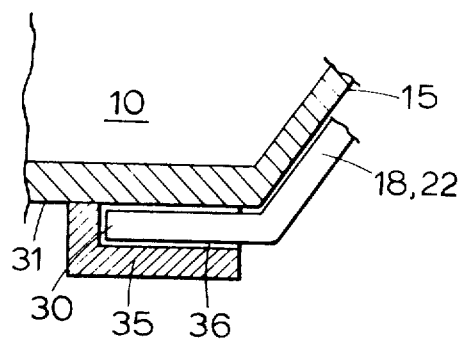
FIGS. 5 and 8 depict alternative forms of fixing means for the securing means of the connections.
Figure 6:
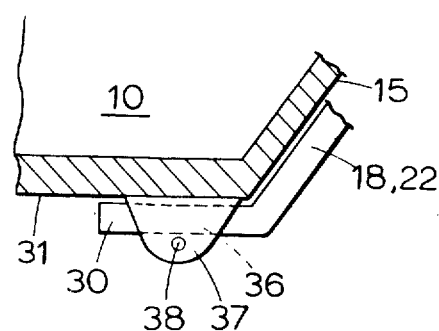
Figure 7:
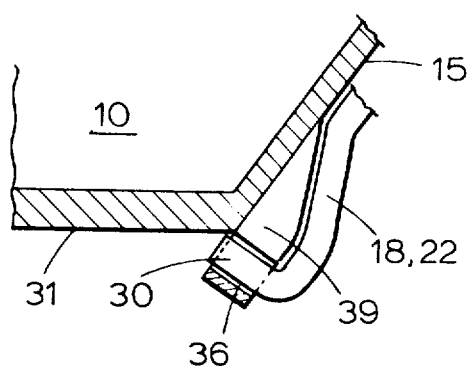

FIGS. 5 to 7 show alternative forms of fixing means for the securing members 18, 22 having the prolonged end portions 30 projecting outwardly from the mouth of the socket part 13. As shown in FIG. 5 a housing structure 35 is attached or formed integrally with the underside 31 of the bar 10 to thereby form a pocket 36 for receiving the associated end portion 30 of the member 18, 22. Additional means such as screws or the like can be used to clamp the end portion 30 into the pocket 36 but this is optional.

FIG. 6 shows an arrangement where a pair of depending lugs 37 are formed on the underside 31 of the bar 10. The lugs 37 are spaced apart to form a pocket 36 for receiving the associated end portion 30 of the member 18, 22. A detachable pin 38 extending between the lugs 37 serves to maintain the portion 30 in this pocket 36.

In the arrangement shown in FIG. 7 the end portion 30 is bent through at a larger angle, in the region of 90°, to the arm 19 of the member 18 or to the remainder of the member 22. Lugs 39 disposed at the region of the mouth of the socket part 13 define a pocket 36 for receiving this end portion and as before additional clamping means can be employed.

Figure 8:
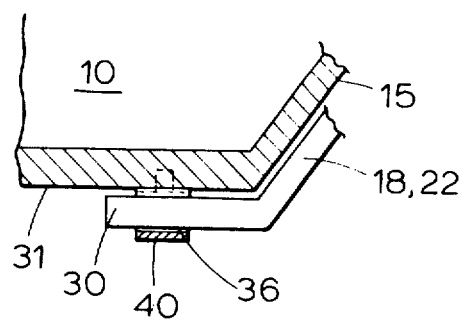

As shown in FIG. 8, the fixing means can take the form of a clamping strap 40 secured to the underside 31 of the bar 10 by screws, for example, and defining a pocket 36 for the end portion 30.

In all the illustrated embodiments, the connection is shown as connecting the head of a prop to a roof bar of a mine support assembly. The connection, which can per se be used to interconnect other components in a mutually perpendicular position could alternatively or additionally be provided to connect the foot of a prop to a floor bar or rail or a support assembly.

We claim:

1. A ball-and-socket type connection for connecting an elongate component and a support prop of a mine support assembly, said connection comprising; a ball part provided on the support prop; a socket part provided on the elongate component; said socket part being shaped to receive said ball part and having a mouth at a side thereof through which the ball part can be introduced, and separate securing means comprising at least one unitary member extending into the socket part through the mouth to engage within the ball part, the unitary member being introducable into the ball part through the mouth and being detachably connected to the elongate component at one or more positions directly accessible from the side of the component in which the mouth is formed to maintain the ball part in the socket part.

2. A connection according to claim 1, wherein there is provided fixing means for detachably connecting the securing means to the elongate component at said position or positions.

3. A connection according to claim 1, wherein said position or positions are disposed in the vicinity of the mouth.

4. A connection according to claim 1, wherein said position or positions are spaced from the mouth in a direction transversely of the socket part.

5. A connection according to claim 1, wherein the divergent arms of the unitary member have end portions which are disposed alongside said side of the component.

6. A connection according to claim 1, wherein the socket part has a curvilinear inner wall portion for engagement with the ball part, the inner wall portion merging with a rectilinear outer wall portion which tapers to widen in a direction outwardly of the socket part to thereby form said mouth.

7. A connection according to claim 6, wherein the securing means is composed of two rod-like unitary members each having one end portion directly engageable in a recess in the ball part and another end portion detachably securable to said elongate component at said one or more positions, and wherein each member is disposed alongside the outer wall portion.

8. A connection according to claim 1, wherein the ball part is provided with a through bore and the securing means in a single one-piece shaped unitary member which extends through the bore in the ball part.

9. A connection according to claim 8, wherein the unitary member is of generally U-shape with divergent arms projecting generally outwardly of the socket part towards said mouth.

10. A connection according to claim 9, wherein the divergent arms of the unitary member have end portions which are disposed alongside said side of the component.

11. A connection according to claim 1, wherein the ball part is provided with a through bore and the securing means is a single one-piece bendable unitary member which is locatable within the bore in the ball part.

12. A connection according to claim 11, wherein the bore in the ball part has outwardly flared openings at the periphery of the ball part.

13. A connection according to claim 1, wherein the securing means comprises two rod-like unitary members each having one end portion directly engageable in a recess in the ball part and another end portion detachably securable to said elongate component at said one or more positions.

14. A connection according to claim 13, wherein each rod-like member is rectilinear with the one end portion terminating in the region of the mouth.

15. A connection according to claim 13, wherein each rod-like member is an angular structure with one limb extending into the socket part and forming said one end portion and a further limb disposed alongside said side of the component and including said other end portion.

16. A connection according to claim 2, wherein said fixing means comprises means for defining a pocket for receiving part of the securing means.

17. A connection according to claim 1, wherein the securing means comprises rod-like elongate unitary members each having a first portion engaging inside an aperture in the ball part and a second portion releasably attached to said side of the elongate component near the mouth of said socket part.

18. A ball-and-socket type connection for connecting an elongate component and a support prop of a mine support assembly; said connection comprising a ball part having a through bore provided on the support prop, a socket part provided on the elongate component; said socket part being shaped to receive said ball part and having a mouth through which the ball part can be introduced and separate securing means comprising a single one-piece bendable unitary member extending into said socket part to engage within the bore in the ball part and being detachably connected to the elongate component at one or more positions generally accessible from the side of the component nearest the mouth of the socket part to maintain the ball part in the socket part wherein the unitary member is initially substantially straight and when installed is of generally U-shape with divergent arms projecting generally outwardly of the socket part towards said mouth, the member being insertable into the bore of the ball part without removal of the ball part from the socket part.

19. A ball-and-socket type connection for connecting an elongate component and a support prop of a mine support assembly; said connection comprising a ball part having a through bore provided on the support prop, a socket part provided on the elongate component; said socket part being shaped to receive said ball part and having a mouth through which the ball part can be introduced and separate securing means comprising a single onepiece unitary member extending into said socket part to engage within the bore in the ball part and being detachably connected to the elongate component at one or more positions generally accessible from the side of the component nearest the mouth of the socket part to maintain the ball part in the socket part wherein the unitary member is initially substantially straight and when installed is of generally U-shape with divergent arms having end portions which are disposed alongside said side of the component and projecting generally outwardly of the socket part towards said mouth, the member being insertable into the bore of the ball part without removal of the ball part from the socket part.

20. A ball-and-socket type connection for connecting an elongate component and a support prop of a mine support assembly, said connection comprising; a ball part having a through bore provided on the support prop; a socket part provided on the elongate component, said socket part being shaped to receive said ball part and having a mouth through which the ball part can be introduced and separate securing means comprising a single one piece bendable unitary member extending into said socket part to engage within the through bore in the ball part and being detachably connected to the elongate component at positions generally accessible from the side of the component nearest the mouth of the socket part to maintain the ball part in the socket part; the unitary member is initially substantially straight and when installed is generally U-shaped with divergent arms projecting generally outwardly of the socket part towards said mouth, the unitary member being insertable into the bore in the ball part without removal of the ball part from the socket part.

21. A ball-and-socket type connection for connecting an elongate component and a support prop of a mine support assembly, said connection comprising; a ball part having a through bore provided on the support prop; a socket part provided on the elongate component and having a curvilinear inner wall portion for engagement with the ball part and a rectilinear outer wall portion merging with the inner wall portion and tapering to widen in a direction outwardly of the socket part to form a mouth through which the ball part can be introduced into the socket part; and separate securing means for maintaining the ball part in the socket part, said securing means comprising a single one-piece bendable unitary member which is located within the bore in the ball part and which is detachably connected to the elongate component at positions generally accessible from the side of the component nearest the mouth, the unitary member being initially substantially straight and when installed in position being of generally U-shaped with divergent arms porjecting generally outwardly of the socket part towards said mouth and disposed alongside the outer wall portion of the socket part.

22. The combination of a component having a socket part provided with a curvilinear inner wall portion adjoining an outer frusto-conical rectilinear wall portion which widens outwardly away from the inner wall portion to form a mouth in a surface of the component, a support prop provided with a complementary part received within the socket part, said complementary part being shaped for introduction through the mouth of the socket part and for mating with the inner wall portion of the socket part, and separate detachable securing means for maintaining the complementary part within the socket part, said securing means comprising at least one unitary member extending into the socket part through the mouth to engage directly within the complementary part, the unitary member being detachably connected to said component at one or more positions directly accessible from said surface of the component and in the region of the mouth.

23. A ball-and-socket type connection for connecting a first member perpendicularly to a second member, said connection comprising; a socket part located on the first member and having a mouth opening in a first surface thereof adjacent the second member, a ball part provided on the second member and receivable in the socket part after introduction through said mouth and securing means in the form of at least one unitary member which extends into the socket part through the mouth to engage directly in the ball part to maintain the latter in the socket part when the connection is assembled, said unitary member being attachable to the first member at one or more positions offset from the center of the ball part when received by the socket part in the direction of the mouth of the socket part, said position or positions being accessible for release of the securing means from the first surface of the first member without removal of the ball part.

24. In a ball-and-socket type connection with a ball part provided on a support prop and a socket part provided on another separate component for receiving the ball part; the improvement comprising forming the socket part with a curvilinear inner wall portion engageable with the ball part and adjoining a rectilinear outer wall portion which tapers to increase the transverse dimension of the socket part outwardly from the inner wall portion to thereby form a mouth through which the ball part can be introduced into the socket part, providing at least one apertured reception zone on the ball part and providing at least one unitary member to maintain the ball part in the socket part, the unitary member extending into the socket part through the mouth thereof and being detachably connected to the other component in a position or positions readily and directly accessible from the mouth side of the other component and projecting into the socket part alongside said outer wall portion to locate and engage directly within said reception zone.

* * * * *